United States Patent [19]
Akimoto et al.

[11] Patent Number: 5,920,047
[45] Date of Patent: Jul. 6, 1999

[54] LEVER SWITCH FOR A VEHICLE

[75] Inventors: Hideaki Akimoto; Norio Uchiyama, both of Tokyo, Japan

[73] Assignee: Niles Parts Co., Ltd., Japan

[21] Appl. No.: 08/978,479

[22] Filed: Nov. 25, 1997

[30] Foreign Application Priority Data

Nov. 26, 1996 [JP] Japan ..................................... 8-329064

[51] Int. Cl.⁶ .............................. H01H 3/04; H01H 3/16; H01H 9/00
[52] U.S. Cl. ..................... 200/61.54; 200/61.27; 200/335
[58] Field of Search .............................. 200/61.27–61.38, 200/61.54–61.57, 293–307, 335; 74/18.1, 484 R

[56] References Cited

U.S. PATENT DOCUMENTS

| | | | |
|---|---|---|---|
| 2,710,317 | 6/1955 | Pearl | 200/61.33 |
| 4,503,300 | 3/1985 | Lane, Jr. | 200/61.54 |
| 5,016,485 | 5/1991 | Kato | 74/18.1 |
| 5,575,177 | 11/1996 | Poleschuk et al. | 200/61.35 X |
| 5,661,276 | 8/1997 | Shibaba | 200/61.35 X |
| 5,708,242 | 1/1998 | Uchiyama | 200/61.54 |
| 5,780,794 | 7/1998 | Uchiyama et al. | 200/61.54 |

FOREIGN PATENT DOCUMENTS 6-36173  5/1994  Japan .............................. H01H 25/00

*Primary Examiner*—J. R. Scott
*Attorney, Agent, or Firm*—Rader, Fishman & Grauer; Ronald P. Kananen

[57] ABSTRACT

A lever switch for a vehicle including a boot having a good appearance. A manipulation lever 1 passes through a lever insertion hole 10*a* formed in a column cover 10 and is mounted pivotably in a switch case 5 by insertion. The boot 9 blocks a space between the switch case 5 and the lever insertion hole 10*a*, and a filling-up member 20 is engaged with a cut-off portion 9*d* of an opening portion 9*c* thereof, which is opened approximately in a trumpet shape. Engaging grooves 9*f*, with which guide rails 20*a* of the filling-up member 20 are engaged, are formed in inner surface portions opposite to each other of the cut-off portion 9*d* in the boot 9. Engaging grooves 2*f* are formed in the boot 9 in the inner surface portions opposite to each other of the cut-off portion, with which nails 20*c* or elastic nails 20*d* are engaged. In the filling-up member 20 there is formed a holding groove 20*b*, which holds a cord 21 wired on the manipulation lever 1 and hung therefrom together with a side wall 5*h* of the switch case 5 by putting the cord 21 between the holding groove 20*b* and the side wall 5*h*.

7 Claims, 4 Drawing Sheets

LEVER SWITCH FOR A VEHICLE

BACKGROUND OF THE INVENTION

1. Field of the Invention

The present invention relates to a construction of a lever switch for a vehicle, for which a boot for a manipulation lever can be mounted by one touch.

2. Description of the Related Art

A conventional lever switch having a boot is disclosed, for example, in Japanese Utility Model No. A-Hei 6-36173. In the conventional lever switch, the boot can be mounted by one touch on a switch case, in which a manipulation lever is supported pivotably around a shaft. The one-touch mounting of the boot is made possible by a cut-off portion formed in the boot, which opens in a trumpet shape.

However, since the conventional boot described above has the cut-off portion, it has a bad appearance. Further, since dust penetrates easily through the cut-off portion, the conventional boot does not function well as a boot for the lever switch.

SUMMARY OF THE INVENTION

An object of the present invention is to provide a lever switch for a vehicle that solves the problems with the conventional lever switch described above.

More specifically, an object of the present invention is to provide a lever switch for a vehicle including a boot having a good appearance and improved functionality.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a lever switch for a vehicle is provided, comprising: a manipulation lever supported pivotably around a shaft in a switch case; a column cover, in which a lever insertion hole, through which the manipulation lever passes, is formed; the switch case disposed in the column cover; and a boot, which blocks a space between the switch case and the lever insertion hole and has an opening portion opened approximately in a trumpet shape, the boot has a cut-off portion in the opening portion, and the cut-off portion is engaged with a filling-up member.

According to another aspect of the present invention, engaging grooves are formed in inner surface portions opposite to each other of the cut-off portion in the boot, and guide rails, which are engaged with the engaging grooves, are formed in the filling-up member.

According to another aspect of the present invention, engaging grooves are formed in inner surface portions opposite to each other of the cut-off portion in the boot, and nails or elastic nails, which are engaged with the engaging grooves, are formed in the filling-up member.

According to yet another aspect of the present invention, a holding groove, which holds a cord wired on the manipulation lever and hung therefrom together with a side wall of the switch case by putting it therebetween, is formed in the filling-up member.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
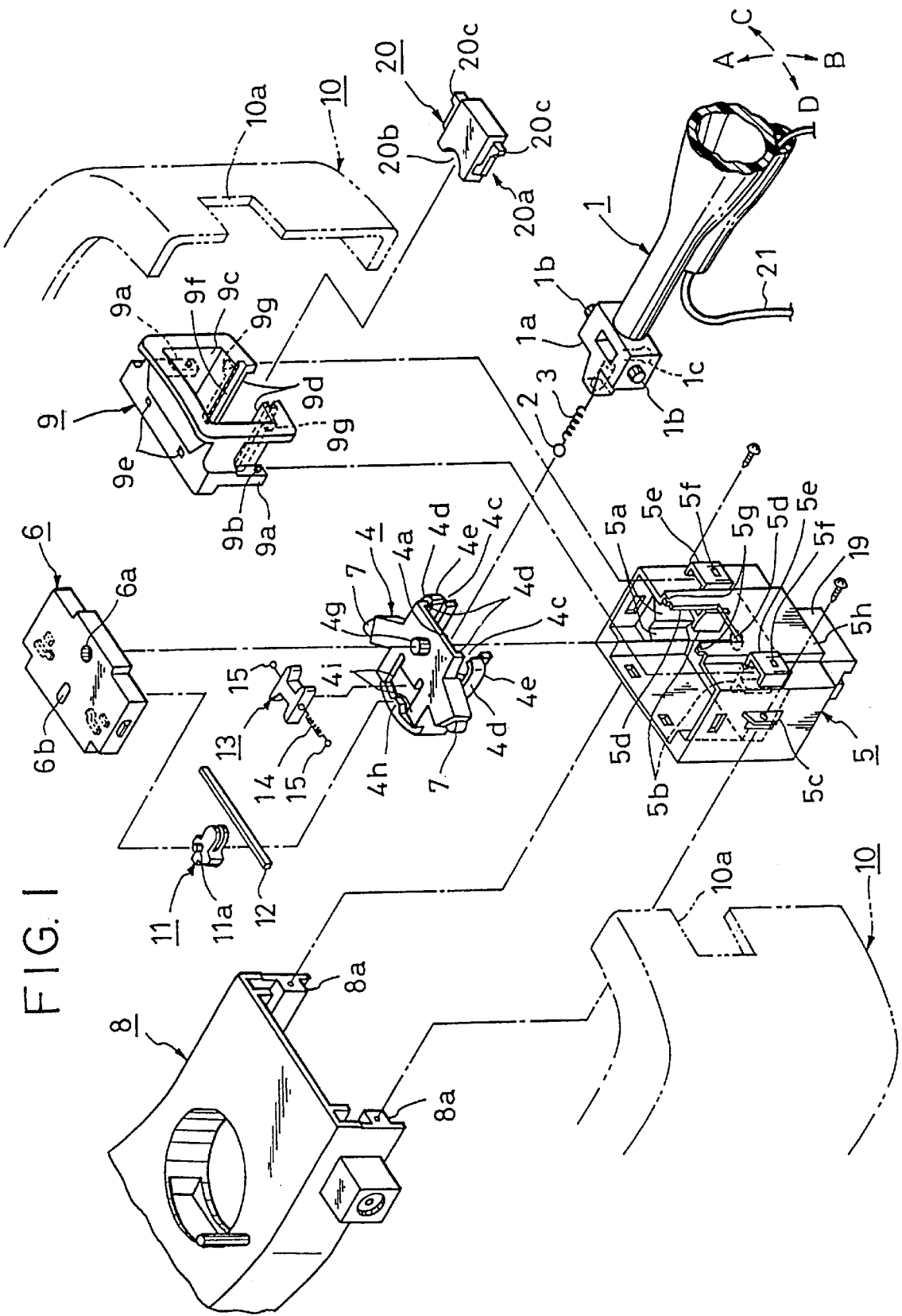
FIG. 1 is an exploded perspective view showing a first embodiment of a lever switch according to the present invention.
Figure 2:
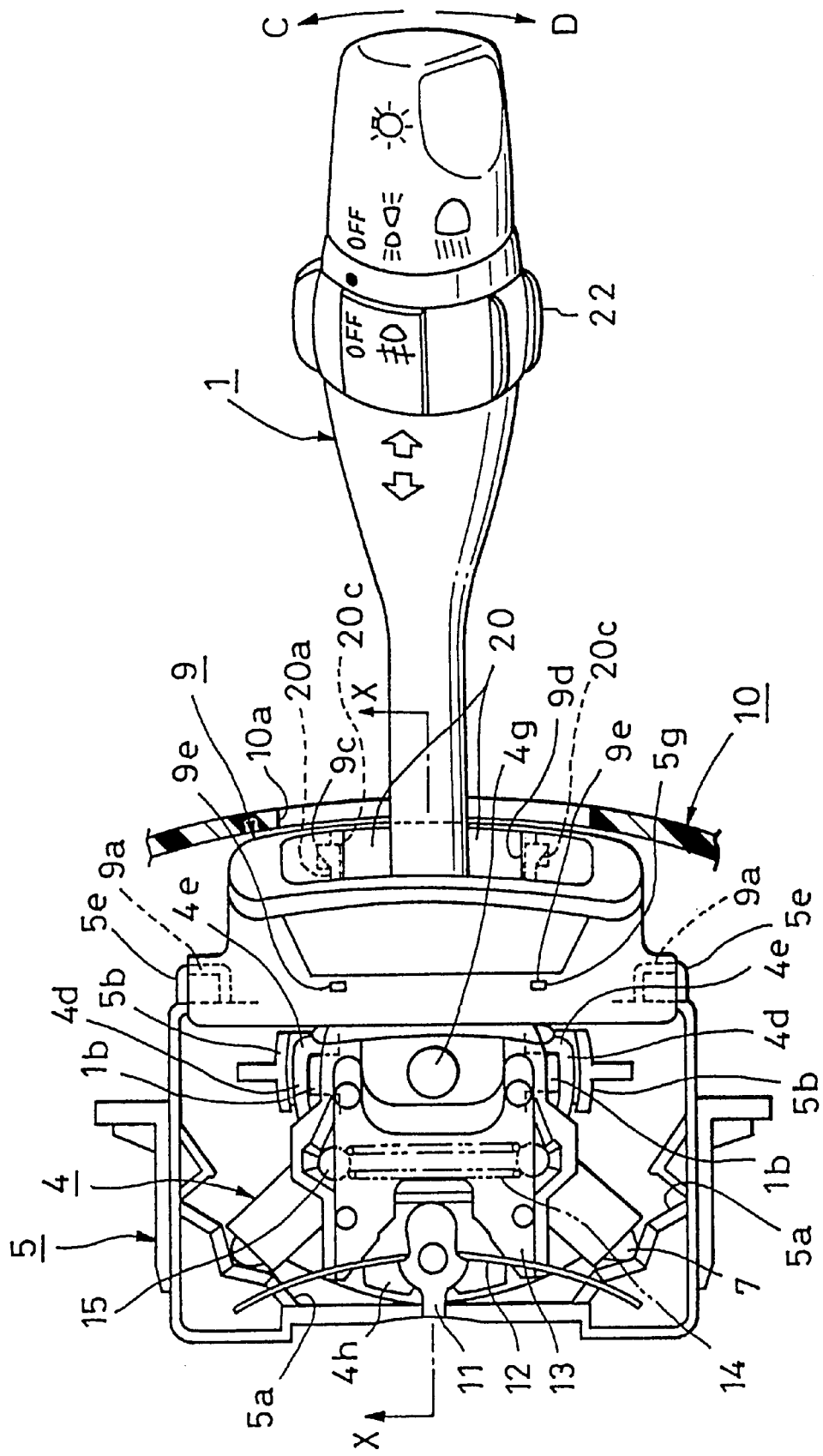
FIG. 2 is a plan view showing the first embodiment of the present invention, when the cover body is taken off.
Figure 3:
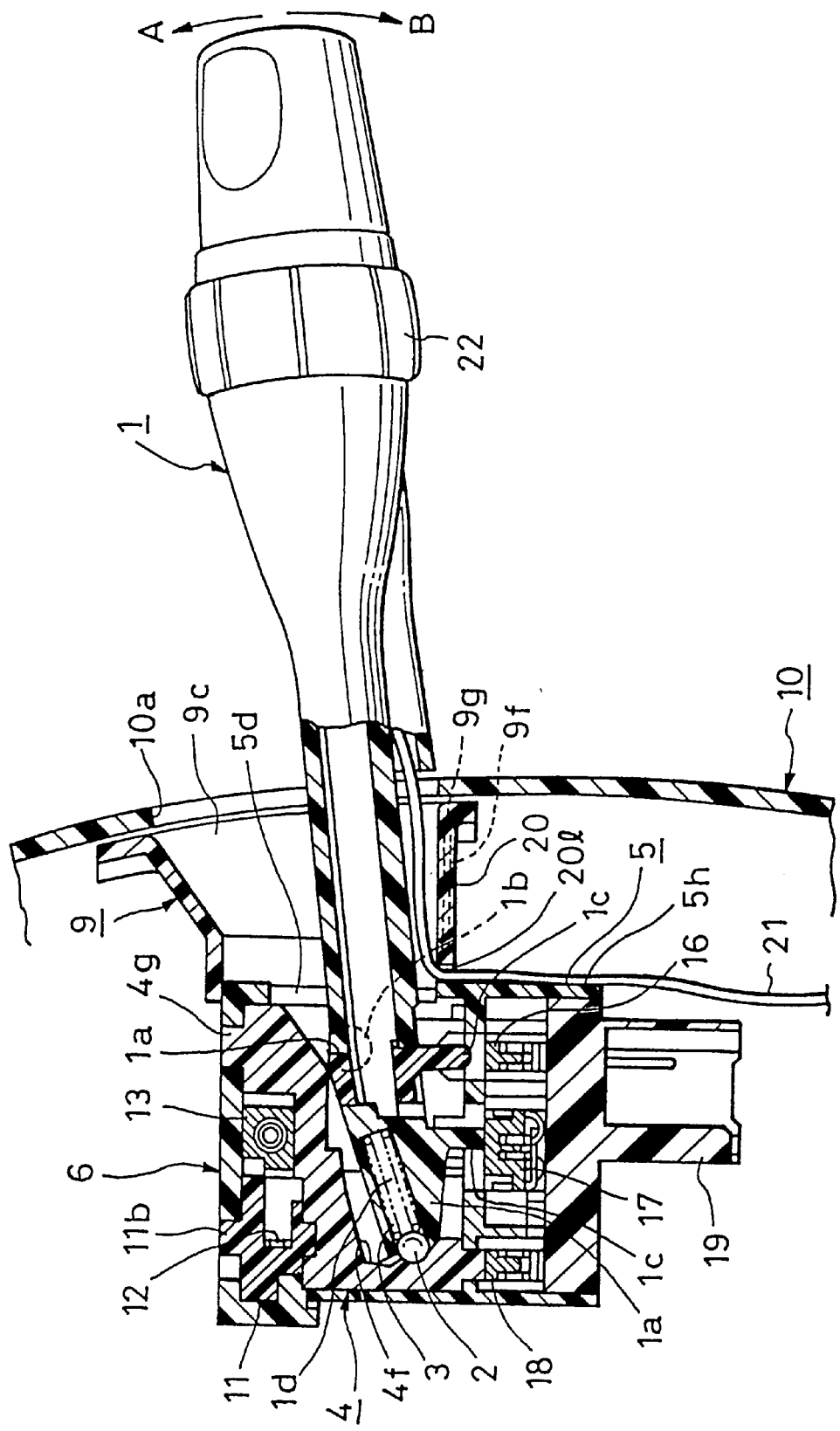
FIG. 3 is a cross-sectional view taken along a line X—X in FIG. 2 in a direction indicated by arrows.

A first embodiment of a lever switch apparatus according to the present invention will now be described in detail with reference to FIGS. 1 to 3 of the accompanying drawings. Although construction of a combination switching device for an automobile will be described below as an example of the lever switch, the present invention is not restricted to this mode for carrying out the present invention.

Reference numeral 1 represents a manipulation lever for a turn indicator for an automobile, a wiper switch, or the like, which pivots in directions indicated by arrows A, B, C and D. On the manipulation lever 1, shaft portions 1b are mounted on two side surfaces of a base portion 1a; a manipulation rod 1c is formed on the lower surface thereof; and a steel ball 2 and a spring 3 are mounted elastically on the extremity thereof on the side of a base 8. The manipulation lever 1 is inserted into an opening portion 4a formed in a movable plate 4 through the steel ball 2 and the spring 3 and supported pivotably by arm portions 4d disposed opposite to each other. The movable plate 4 is inserted downward into a switch case 5 and supported pivotably together with a cover body 6, putting the movable plate 4 between the switch case 5 and the cover body 6. Nodular pins 7, which are contacted with pressure with nodular grooves 5a formed in the switch case 5, are mounted elastically on the movable plate 4. The opening portion 4a is formed in the side surface portion on the side of the manipulation lever 1 and the lower surface portion of the movable plate 4.

Shaft supporting portions, each of which has a V-shaped hole 4c into which one of shaft portions 1b is inserted, are formed on the two sides of the opening portion 4a, opposite to each other. The arm portions 4d are two right and left bent elastic pieces disposed opposite to each other at positions where the shaft portions are supported. The two right and left arm portions 4d hold extremities of the two right and left shaft portions by putting them therebetween. A nail 4e is formed at the extremity of each of the two arm portions 4d. The nails 4e embrace the shaft supporting portions so as to hold pivotably the manipulation lever 1 therein so that it does not get away from the movable plate 4.

In the switch case 5, there are disposed approximately arc-shaped falling-off preventing walls 5b at positions exterior to the arm portions 4d of the movable plate 4, opposite to each other. Ear portions 5c are formed on the two side surfaces of the switch case 5. The ear portions 5c are engaged with peripheries of screwing portions 8a of a base 8 and secured thereto by means of screws. A window portion 5d is formed in the switch case 5 for making the manipulation lever 1 protrude from the interior of the switch case 5. The switch case 5 has engaging portions 5e outside of the window portion 5d, with which protruding pieces 9a of a boot 9 are engaged by insertion.

Each of the engaging portions 5e is pipe-shaped. A hole 5f is formed in a side wall of each engaging portion 5e, with which a nail 9b of each of the protruding pieces 9a is engaged. The engaging portions 5e are not necessarily pipes, in each of which the hole 5f is formed, but they may be hooks and the like, at which the boot 9 is stopped.

In the cover body 6 there are formed a shaft hole 6a, with which a supporting shaft 4g of the movable plate 4 is engaged by insertion, and an oblong hole 6b, with which a shaft portion 11a of a cancel cam 11 is engaged by insertion. The cover body 6 holds the two extremities of a plate spring 12 engaged with the cancel cam 11 by recess portions formed in the lower surface portion thereof.

As viewed through a lever insertion hole 10a formed in a column cover 10 from the exterior, the boot 9 hides the switch case 5, the base 8, and so forth, so that they cannot be seen. The boot 9 is made of a resin material having the same properties as the manipulation lever 1, the switch case 5, and so forth. The boot 9 is approximately trumpet-shaped and so disposed that the extremity of an opening portion 9c thereof is in accordance with the inner periphery of the lever insertion hole 10a of the column cover 10. A cut-off portion 9d for making the manipulation lever 1, supported pivotably in the switch case 5, pass therethrough is formed in the lower surface portion of the boot 9.

Engaging grooves 9f, with which guide rails 20a of a filling-up member 20 are engaged, are formed in inner surface portions opposite to each other of the cut-off portions 9d. In the filling-up member 20 there is formed a holding groove 20b, which holds a cord 21 wired on the manipulation lever 1 together with a side wall 5h of the switch case 5. Positioning holes 9e are provided with which protruding portions 5g formed on the switch case 5 are engaged. The engaging grooves 9f are so formed that the surface of the filling-up member 20 is in accordance with the inner surface of the opening portion 9c and holds the filling-up member 20 by inserting the guide rails 20a into them. Each of the engaging grooves 9f has a step portion 9g, with which each of the nails 20c is engaged. The column cover 10 is formed by unifying two members approximately symmetric to each other so as to enclose the base, on which the switch case 5 and so forth are mounted. The cancel cam 11 is energized by the plate spring 12, whose two extremities are held by the cover body 6 and supported by the oblong hole 6b formed in the cover body 6.

A movable piece 13 is provided, which moves on a straight line in the direction of the manipulation lever 1 between the movable plate 4 and the cover body 6.

A spring 14 and a steel ball 15 are disposed by insertion into each of the side walls of the movable plate 4, which are in a direction perpendicular to the direction of the straight line, along which the movable piece 13 moves. The movable piece 13 is retained at a predetermined position on the movable plate 4 by bringing the steel ball 15 into contact with pressure with one of the engaging grooves 4i formed in the movable plate 4.

The filling-up member 20 is made of the same material, for example, as the boot. The boot 9 has an approximately perfect trumpet shape by inserting the filling-up member 20 into the engaging grooves 9f. The cord 21 is held by the boot 9 and the side wall 5h of the switch case 5 by mounting the filling-up member 20 on the boot 9. The guide rails 20a, each of which has a nail 20c, are formed on the two side surfaces of the filling-up member 20 so as to protrude therefrom. The cord 21 connects a base plate (not indicated in the figures), on which there are fixed contacts of rotary switches of, for example, a fog lamp switch or the like, disposed on the manipulation lever 1, with an electric power supply.

Figure 4:
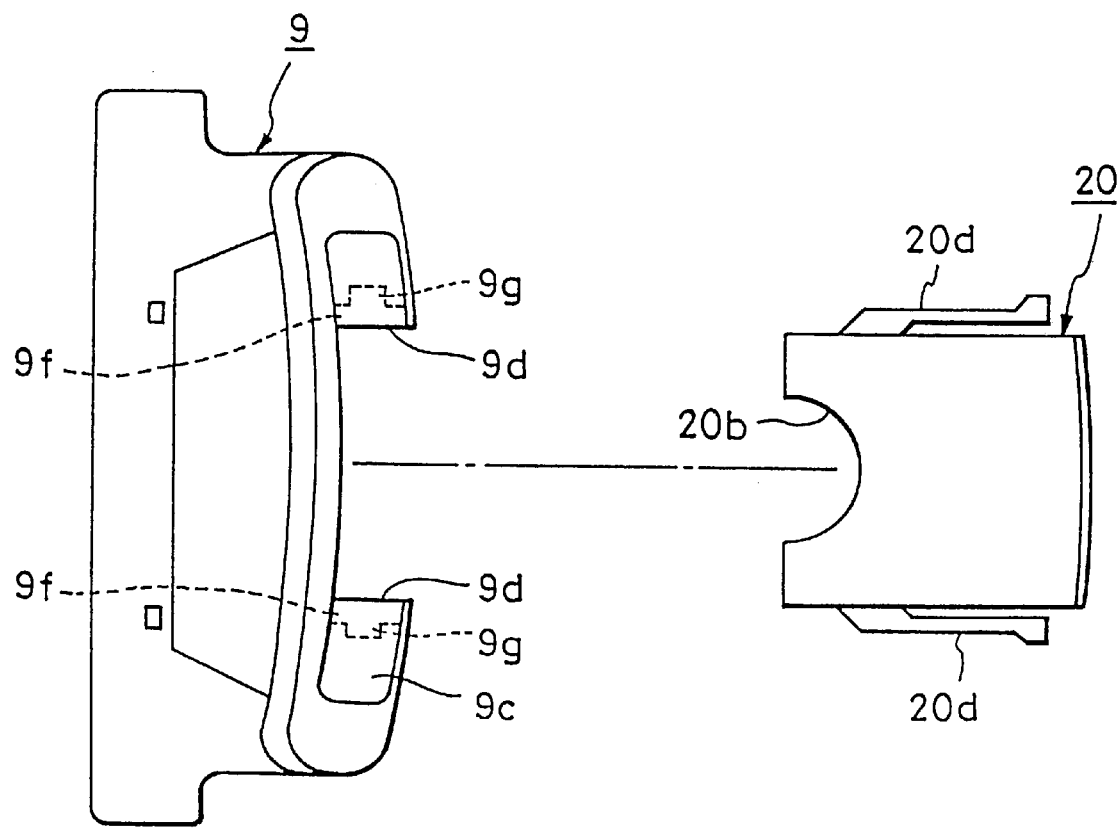
FIG. 4 is a diagram showing another mode for carrying out the present invention.

FIG. 4 is an exploded plan view showing another mode of realization of the filling-up member 20'. The filling-up member 20' shown in FIG. 4 has elastic nails 20d, which makes the filling-up member 20' mountable on the boot 9 and dismountable therefrom, in lieu of the guide rails 20a and the nails 20c. The filling-up member 20' has the elastic nails 20d, which are inserted into the engaging grooves 9f and engaged with the step portions 9g to stop them.

The lever switch according to the preferred embodiments of the present invention is constructed as described above. The procedure for mounting the lever switch and the action thereof will now be described below in detail.

The manipulation lever 1 is inserted into the opening portion 4a of the movable plate 4 in a transversal direction together with the steel balls 2 and the springs 3. The steel balls 2 are brought into contact with pressure with the nodular grooves 4f and, in this way, a nodular feeling is given to a pivoting manipulation of the manipulation lever 1. The shaft portions 1b push the nails 4e to outstretch the two arm portions 4d towards the two sides. In this way the shaft portions 1b are inserted into the holes 4c formed in the shaft supporting portions 4b and supported pivotably in a state where they are put between the two arm portions 4d.

The movable piece 13, into which the springs 14 and the steel balls 15 are inserted, is set on the movable plate 4. The movable plate 4, on which the nodular pins 7 are elastically mounted, is inserted into the switch case 5. At this time, the nodular pins 7 are brought into contact with pressure with the nodular grooves 5a to support the movable plate 4. The two arm portions 4d are arranged inside of the two falling-out preventing walls 5b.

The plate spring 12 is inserted into the cancel cam 11 to engage the cancel cam 11 with the cover body 6 on the two sides of the plate spring 12. At the same time the shaft portion 11a of the cancel cam 11 is inserted into the oblong hole 6b. The cover body 6 is set on the switch case 5. In this way the manipulation lever 1, the movable plate 4, the movable piece 13, the cancel cam 11, and the plate spring 12 are arranged within the switch case 5.

The protruding pieces 9a of the boot 9 are engaged with the pipe-shaped engaging portions 5e of the switch case 5 by inserting them downward into the pipe-shaped engaging portion 5e. At the same time, the protruding portions 5g are inserted into the positioning holes 9e. The nails 9b are engaged with the holes 5f and, in this way, the boot 9 is mounted on the switch case 5 in a so-called one-touch manner (i.e., by merely pushing the components together). The manipulation lever 1 is positioned approximately at the center of the opening portion 9c of the boot 9.

Further, since the cut-off portion 9d, through which the manipulation lever 1 passes, is formed in the lower surface portion of the boot 9, the switch case 5, on which the manipulation lever 1 is mounted, can be mounted and dismounted easily.

The opening portion 9c of the boot 9 is formed so as to be opened approximately in a trumpet shape towards the handle side of the manipulation lever 1.

In this way the boot 9 can be mounted without contact with the manipulation lever 1. Grooves for mounting the boot disposed at the periphery of the prior art manipulation lever become unnecessary. The boot 9 can be used for any kind of the manipulation lever 1, independently from the shape and the size thereof.

Next the filling-up member 20 is mounted by insertion into the cut-off portion 9d of the boot 9 after having arranged the cord 21 therein. The filling-up member 20 is held by elasticity produced due to the fact that the cut-off portion 9d is formed in the boot 9 and by the fact that the guide rails 20a and the nails 20c are engaged with the engaging grooves 9f. The cord 21 is held by the holding groove 20b of the filling-up member 20 and the side wall 5h of the switch case 5 by being put therebetween.

The filling-up member 20 prevents the cord 21 from being oscillated by, for example, oscillation of the automobile on which the switch is mounted.

Movable pieces 16, 17, 18 and a base plate 19 are mounted on the lower surface portion of the switch case 5 by engaging them therewith. The switch case 5 is slid to be inserted in a transversal direction and secured to the base 8 by means of screws. The column cover 10 is formed by combining two parts so as to enclose the base 8. The two combined parts of the column cover 10 are adhered to each other.

The action of the lever switch according to the present invention will now be described in detail.

When one looks in a direction from the door side of a front seat in an interior of an automobile to the column cover 10, one can see the lever insertion hole 10a. Inside of the lever insertion hole 10a, the boot, on the cut-off portion 9d of the opening portion 9c of which the filling-up member 20 is mounted, is seen. Since the filling-up member 20 is mounted on the cut-off portion 9d by engaging it therewith, the cut-off portion 9d does not appear as an open hole. Thus, the boot has a good appearance. The switch case 5 and the base 8 are hidden and not seen.

Further, since the boot 9 is in a state where the filling-up member 20 fills the cut-off portion 9d, the boot 9 can be arranged so as to be in conformity with the lever insertion hole 10a, and wall surface portions are arranged around it. In this way the boot 9 prevents dust and the like from penetrating into the column cover 10 and the switch case.

When the manipulation lever 1 is moved in the directions indicated by the arrows A, B, C and D, since the boot is so-called trumpet-shaped, the manipulation lever is not brought into contact with the boot 9. Since the boot 9 is not brought into contact with the manipulation lever 1 and does not move together with the manipulation lever 1, when the manipulation lever 1 is moved by pivoting, it is possible to make the boot 9 of, for example, hard resin or the like instead of rubber, which materials are not deformed by bending. For this reason, the boot 9 can be made of a hard resin material, which is cheap and durable. The boot 9 can be applied to all kinds of the manipulation lever 1, independently from the size of the manipulation lever 1 and from the presence or absence of the cord 21.

FIG. 4 is an exploded plan view showing another mode of realization of the filling-up member 20'. The filling-up member 20' shown in FIG. 4 has elastic nails 20d, which makes the filling-up member 20' mountable on the boot 9 and dismountable therefrom, in lieu of the guide rails 20a and the nails 20c described above. The filling-up member 20' shown in FIG. 4 has the elastic nails 20d, which are inserted into the engaging grooves 9f and engaged with the step portions 9g to stop them. Work for mounting and dismounting the filling-up member 20' is made further easier owing to the fact that the elastic nails 20d are formed on the filling-up member 20'.

Since the present invention is constructed as explained above, the following novel features and effects can be obtained.

First, as described above, a lever switch is provided for a vehicle including a manipulation lever supported pivotably around a shaft in a switch case; a column cover, in which a lever insertion hole, through which the manipulation lever passes, is formed; the switch case disposed in the column cover; and a boot, which blocks a space between the switch case and the lever insertion hole and has an opening portion opened approximately in a trumpet shape, the boot has a cut-off portion in the opening portion and the cut-off portion is engaged with a filling-up member, the cut-off portion of the boot can be blocked, and the boot is made approximately in a perfect trumpet shape. By this structure, it is possible to improve the appearance and to prevent dust and the like from penetrating into the switch case and the column cover through the cut-off portion.

Second, owing to the fact that engaging grooves are formed in inner surface portions opposite to each other of the cut-off portion in the boot, and that guide rails, which are engaged with the engaging grooves, are formed in the filling-up member, the filling-up member can be in accordance with the inner surface of the opening portion of the boot so that it can be easily mounted.

Third, owing to the fact that engaging grooves are formed in inner surface portions opposite to each other of the cut-off portion in the boot, and that nails or elastic nails, which are engaged with the engaging grooves, are formed in the filling-up member, the filling-up member can be mounted on the cut-off portion of the boot and freely dismountable therefrom so that it is very convenient for wiring and holding the cord.

Fourth, owing to the fact that a holding groove, which holds a cord wired on the manipulation lever and hung therefrom together with a side wall of the switch case by putting it therebetween, is formed in the filling-up member, it is possible to hold the cord without using any special cord holder or the like, and to reduce the number of parts and mounting steps.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A lever switch for a vehicle, comprising:

a manipulation lever (1) supported pivotably around a shaft in a switch case (5);

a column cover (10), in which a lever insertion hole (10a), through which said manipulation lever (1) passes, is formed;

said switch case (5) being separate from and disposed in said column cover (10); and a boot, which blocks a space between said switch case (5) and said lever insertion hole (10a) and has an opening portion (9c) opened approximately in a trumpet shape;

said boot (9) having a cut-off portion (9d) in said opening portion (9c), and said cut-off portion (9d) is engaged with a filling-up member (20) so as to fill said cut-off portion (9d), said filling-up member (20) being a separate part from said cut-off portion (9d).

2. The lever switch for a vehicle according to claim 1, wherein engaging grooves (9f) are formed in inner surface portions opposite to each other of said cut-off portion (9d) in said boot (9), and wherein guide rails (20a), which are engaged with said engaging grooves (9f), are formed on said filling-up member (20).

3. The lever switch for a vehicle according to claim 1, wherein engaging grooves (9f) are formed in inner surface portions opposite to each other of said cut-off portion (9d) in said boot (9), and wherein nails (20c, 20d), which are engaged with said engaging grooves (9f), are formed on said filling-up member (20, 20').

4. The lever switch for a vehicle according to claim 3, wherein a holding groove (20b) is formed in said filling-up member (20, 20'), which holds a cord (21) wired on said manipulation lever (1) and hung therefrom together with a side wall (5h) of said switch case (5) by putting the cord (21) between the holding groove (20b) and the side wall (5h).

5. The lever switch for a vehicle according to claim 2, wherein a holding groove (20b) is formed in said filling-up member (20), which holds a cord (21) wired on said manipulation lever (1) and hung therefrom together with a side wall (5h) of said switch case (5) by putting the cord (21) between the holding groove (20b) and the side wall (5h).

6. A lever switch for a vehicle, comprising:

a manipulation lever (1) supported pivotably around a shaft in a switch case (5);

a column cover (10) having a lever insertion hole (10a) through which said manipulation lever (1) passes, said switch case (5) disposed within said column cover (10);

a boot (9) which is arranged around said manipulation lever (1), said boot (9) being positioned so as to block a space between said switch case (5) and said lever insertion hole (10a), said boot (9) having an opening portion (9c) opened approximately in a trumpet shape to facilitate movement of said manipulation lever (1), said boot (9) having a cut-off portion (9d) through which said manipulation lever (1) passes during assembly, and engaging grooves (9f) formed in inner surface portions opposite to each other of said cut-off portion (9d); and a filling-up member (20, 20') positioned within said cut-off portion (9d) so as to fill said cut-off portion (9d), said filling-up member (20, 20') having first and second engaging portions formed thereon which are engaged with said engaging grooves (9f) of said boot (9).

7. The lever switch according to claim 6, wherein a holding groove (20b) is formed in said filling-up member (20, 20'), said holding groove (20b) being configured to hold a cord (21) wired on said manipulation lever (1) and hung therefrom together with a side wall (5h) of said switch case (5) by putting the cord (21) between the holding groove (20b) and the side wall (5h).

* * * * *